(12) United States Patent
Chung

(10) Patent No.: US 8,463,499 B2
(45) Date of Patent: Jun. 11, 2013

(54) CONTROL METHOD FOR VEHICLE

(75) Inventor: Seunghwan Chung, Seoul (KR)

(73) Assignee: Hyundai Mobis Co., Ltd. (KR)

( * ) Notice: Subject to any disclaimer, the term of this patent is extended or adjusted under 35 U.S.C. 154(b) by 730 days.

(21) Appl. No.: 12/620,895

(22) Filed: Nov. 18, 2009

(65) Prior Publication Data
US 2010/0152973 A1   Jun. 17, 2010

(30) Foreign Application Priority Data
Dec. 11, 2008   (KR) .................. 10-2008-0125714

(51) Int. Cl.
*B62D 6/00*   (2006.01)
(52) U.S. Cl.
USPC .......................................................... 701/42
(58) Field of Classification Search
USPC .......................................................... 701/42
See application file for complete search history.

(56) References Cited

U.S. PATENT DOCUMENTS
8,175,771 B2 *   5/2012   Ukai et al. ...................... 701/41

FOREIGN PATENT DOCUMENTS
| JP | 2000-162230 A | 6/2000 |
| KR | 10-0715697 B1 | 5/2007 |
| KR | 10-0771003 B1 | 10/2007 |

* cited by examiner

*Primary Examiner* — Eric Culbreth
(74) *Attorney, Agent, or Firm* — Knobbe Martens Olson & Bear, LLP.

(57) ABSTRACT

Disclosed is a method of controlling a vehicle safely and stably. The method involves determining whether the vehicle is moving forward or backward without a TCU or a specific sensor for detecting whether the vehicle is moving forward or backward. The method further involves controlling at least one apparatus of the vehicle for controlling the wheels based on the determination.

6 Claims, 4 Drawing Sheets

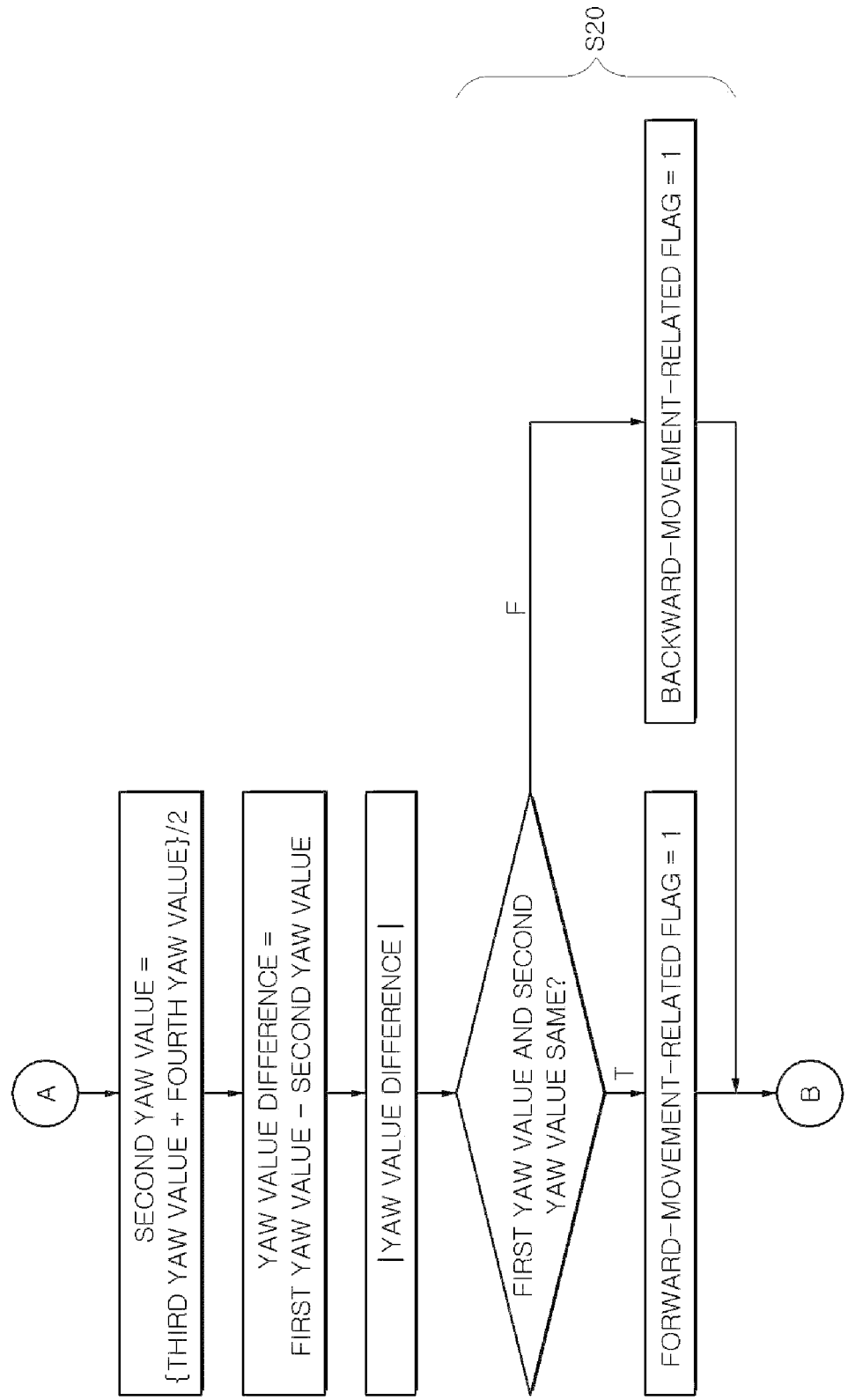

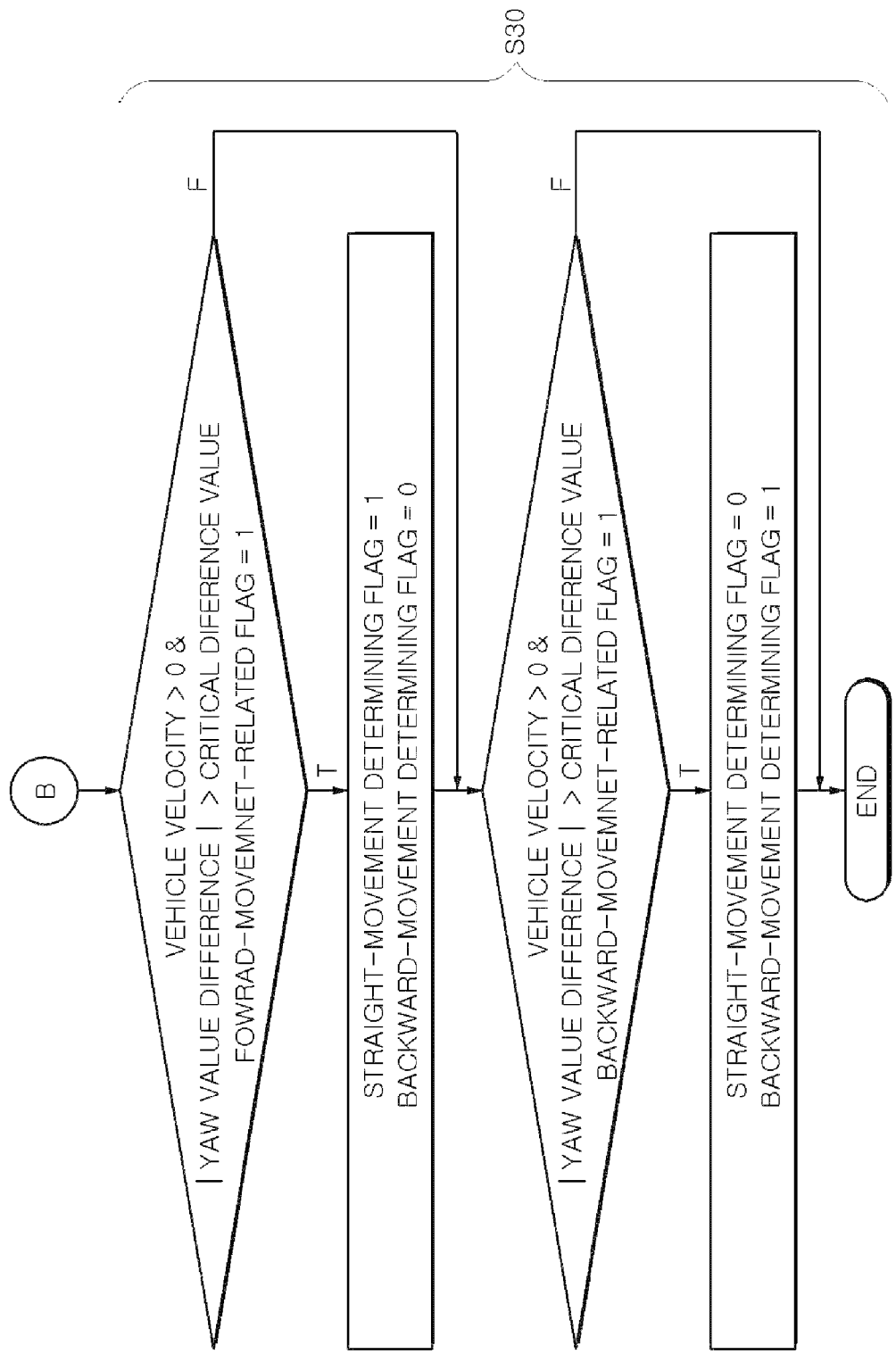

CONTROL METHOD FOR VEHICLE

CROSS-REFERENCE TO RELATED APPLICATIONS

The present application is based on, and claims priority from, Korean Application Serial Number 10-2008-0125714, filed on Dec. 11, 2008, the disclosure of which is hereby incorporated by reference herein in its entirety.

BACKGROUND

1. Field

The present disclosure relates to a method of controlling a vehicle.

2. Discussion of Related Technology

An ABS is a system for ensuring steering stability of a vehicle by preventing a wheel of the vehicle from locking in braking. A TCS is a system that maximizes acceleration of a vehicle by appropriately controlling slip of the driving wheels when the vehicle is started or accelerated, and helps the vehicle stably turn by reducing the engine torque when the vehicle turns. An ESC is a system that stabilizes movements of a vehicle by generating a braking force using hydraulic pressure when the vehicle, which is turning, exceeds the limit performance.

These systems actively control movements of wheels and enable stable traveling of a vehicle and improve safety by appropriately performing required control of the vehicle.

In a vehicle equipped with an automatic transmission, a controller, such as ABS, TCS, and ESC, properly receives information indicative of whether a vehicle is moving forward or backward from a TCU (Transmission Control Unit) through a CAN (Car Area Network) and correspondingly performs control. However, in a vehicle equipped with a manual transmission, a TCU is not provided, such that a controller, such as ABS, TCS, and ESC, cannot recognize whether the vehicle is moving forward or backward.

SUMMARY

The ABS, TCS, and ESC perform the control in consideration of the turning speed (Yaw) of a vehicle, basically under assumption of when the vehicle is moving forward. However, the turning speed (Yaw) generated while the vehicle is moving forward and the turning speed (Yaw) generated while the vehicle is moving backward are generated in the direct opposite way. Thus, if the ABS, TCS, or ESC operates while the vehicle is moving backward, without recognizing the backward movement, a problem may be caused in safety of the vehicle.

Embodiments of the present invention provide a control method for a vehicle that determines whether the vehicle is moving forward or backward, without a TCU or a specific sensor for detecting whether the vehicle is moving forward or backward, and controls apparatuses for controlling the wheels according to movements of the vehicle on the basis of the determined result.

A control method for a vehicle according to the present invention includes: a step of determining stop of the vehicle that determines whether the vehicle is in stop; and a step of determining forward or backward-movement of the vehicle that compares the sign of a first yaw value of the vehicle obtained by an output value of a yaw sensor with the sign of a second yaw value obtained by an output value of a steering angle sensor, and then determines that the vehicle is moving forward when the signs are the same and determines that the vehicle is moving backward when the signs are different from each other, on the condition that the vehicle is not in stop as a result of the step of determining stop of the vehicle.

The second yaw value may be an average value of a third yaw value calculated from the output value of the steering angle sensor and a fourth yaw value calculated from an output value of a lateral acceleration sensor.

The third yaw value $\psi_3$ may be calculated from the following formula, $$\dot\psi = \frac{\delta_{swa}}{i_L l} \times \frac{V_{ref}}{\left(1 + \left(\frac{V_{ref}}{V_{ch}}\right)^2\right)}$$

where $\delta_{swa}$: steering wheel angle
$i_L$: steering ratio
l: wheel base
$V_{ref}$: vehicle reference velocity
$V_{ch}$: characteristic vehicle velocity.

The fourth yaw value $\psi_4$ may be calculated by the following formula, $$\dot\psi_4 = \frac{a_{lat}}{V_{ref}}$$

where $a_{lat}$: lateral acceleration.

Further, the control method for a vehicle further includes a step of deciding determination that decides the determination about whether the vehicle is moving forward or backward, which is determined by the step of determining forward or backward-movement, when the absolute value of the difference between the first yaw value and the second yaw value exceeds a predetermined critical difference value, after the step of determining forward or backward-movement.

It is determined that the vehicle is in stop, when the velocities of all of the wheels of the vehicle are smaller than a critical stop value and the absolute value of the first yaw value is smaller than a critical turning value, in the step of determining stop of vehicle.

The first yaw value may be a value corrected by adding or subtracting an off-set corresponding to an output at the neutral condition of the yaw sensor to or from the output value of the yaw sensor.

The present invention makes it possible to control a vehicle safely and stably by determining whether the vehicle is moving forward or backward, without a TCU or a specific sensor for detecting whether the vehicle is moving forward or backward, and controlling apparatuses for controlling the wheels according to movements of the vehicle on the basis of the determined result.

BRIEF DESCRIPTION OF THE DRAWINGS

For understanding of the nature and features of the present invention, reference should be made to the following detailed description with the accompanying drawings, in which:

FIGS. 1A to 1C are flowcharts illustrating an embodiment of a control method for a vehicle according to the present invention.

DETAILED DESCRIPTION OF EMBODIMENTS

Figure 1A:
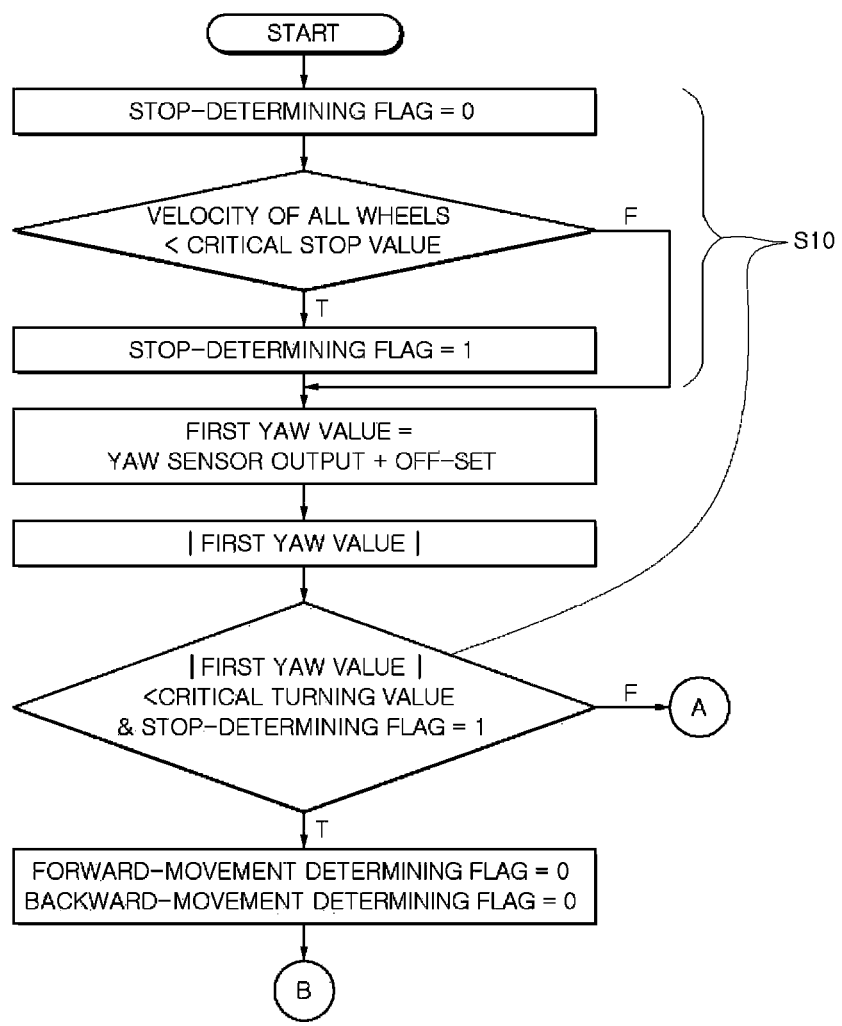

Referring to FIGS. 1A to 1C and 2, a control method for a vehicle according to an embodiment of the present invention includes a step of determining stop of vehicle that determines whether a vehicle is in stop (S10), a step of determining forward or backward-movement of vehicle that determines whether the vehicle is moving forward or backward by comparing the sign of a first yaw value of the vehicle obtained form an output value of a yaw sensor with the sign of a second yaw value obtained by an output value of a steering angle sensor as reflecting the driver's steering intention (S20), and a step of deciding determination that decides the determination about whether the vehicle is moving forward or backward (S30), which is determined by the step of determining forward or backward-movement (S20), when the absolute value of the difference between the first yaw value and the second yaw value exceeds a predetermined critical difference value.

In the step of determining stop of vehicle (S10), it is determined that the vehicle is in stop, when the velocities of all the wheels of the vehicle are smaller than a critical stop value and the absolute value of the first yaw value is smaller than a critical turning value.

First, after a stop-determining flag is initiated to zero, when the velocities of all of the wheels, i.e. the four wheel of a vehicle are smaller than a predetermined critical stop value, the stop-determining flag is set to 1.

The stop-determining value is a value that makes it possible to consider that the vehicle is in stop on the basis of the velocities of the wheels, and is set in advance to an appropriate level by experiments and analysis.

The first yaw value is calculated for comparison with the critical turning value, in which the first yaw value is a value that is corrected by adding or subtracting an off-set corresponding to an output value at the neutral condition of the yaw sensor to or from the output value of the yaw sensor equipped in the vehicle.

It is determined whether the absolute value of the first yaw value is smaller than the critical turning value. When the absolute value of the first yaw value is smaller than the critical turning value, it can be construed as that the vehicle does not turn left or right, in which the critical turning value is determined in advance by experiments and analysis, as a yaw value that makes it possible to consider that the vehicle does not turn.

When it is determined that the vehicle is in stop as a result of performing the step of determining stop of vehicle (S10), all of forward-movement determining flag and backward-movement determining flag are set to zero.

When it is determined that the vehicle is not in stop as a result of performing the step of determining stop of vehicle (S10), the signals of the first yaw value of the vehicle obtained by the output value of the yaw sensor and the second yaw value where the driver's steering intention is reflected by the output value of the steering angle sensor are compared, such that the a step of determining forward or backward-movement (S20) that determines that the vehicle is moving forward when the signals are the same, or determines that the vehicle is moving backward when the signals are different is performed.

Figure 2:
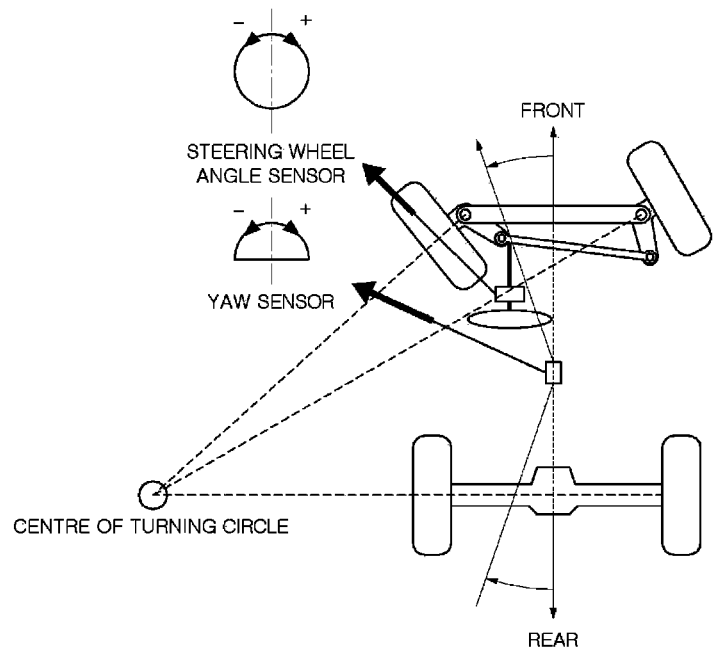
FIG. 2 is a view illustrating the principle of the present invention.

That is, the second yaw value is a yaw value where the driver's steering intention is reflected and the first yaw value is a practical yaw value of the vehicle according to steering operation by the driver, such that, as illustrated in FIG. 2, if the signals of the yaw value of the vehicle according to the driver's steering intention and the corresponding yaw value of the vehicle are the same, the vehicle is moving forward, and if the signals of the yaw values are different, the vehicle is moving backward.

The second yaw value is an average value of a third yaw value calculated from the output value of the steering angle sensor and a fourth yaw value calculated from the output value of a lateral acceleration sensor, and the third yaw value $\dot{\psi}_3$ is calculated from the following formula 1, $$\dot{\psi}_3 = \frac{\delta_{swa}}{i_L l} \times \frac{V_{ref}}{\left(1 + \left(\frac{V_{ref}}{V_{ch}}\right)^2\right)} \qquad \text{[Formula 1]}$$

where $\delta_{swa}$: steering wheel angle
$i_L$: steering ratio
l: wheel base
$V_{ref}$: vehicle reference velocity
$V_{ch}$: characteristic vehicle velocity.

On the other hand the fourth yaw value $\dot{\psi}_4$ is calculated by the following formula $$\dot{\psi}_4 = \frac{a_{lat}}{V_{ref}} \qquad \text{[Formula 2]}$$

where $a_{lat}$: lateral acceleration.

When it is determined that the vehicle is moving forward as a result of performing the step of determining forward or backward-movement (S20), a forward-movement-related flag is set to 1, and when it is determined that the vehicle is moving backward, a backward-movement-related flag is set to 1.

After the step of determining forward or backward-movement (S20), when the absolute value of the difference of the first yaw value and the second yaw value exceeds a predetermined critical difference value, the step of deciding determination (S30) that decides the determination about the forward- or backward-movement of the vehicle determined by the step of determining forward or backward-movement (S20) is performed.

The difference in the first yaw value and the second yaw value and the absolute value that are needed in the above are included to be calculated at the step of determining forward or backward-movement (S20), in the flowcharts shown in FIGS. 1A to 1C; however, if the first yaw value and the second yaw value, which are presuppositions for the calculation, has been substantially obtained, the calculation may be performed after or before the step of determining forward or backward-movement (S20).

Confirming whether the absolute value of the yaw value difference is larger than the critical difference value is for confirming that the forward or backward-movement determined by the step of determining forward or backward-movement (S20) gives some reliability to the traveling condition of the vehicle, in which the critical difference value is appropriately determined in advance by experiments and analysis to correspond to the above purpose.

When it is determined that the yaw value difference is larger than the critical difference value at the step of deciding determination (S30) as described above, whether the vehicle is moving forward or backward is decided by the forward-movement determining flag and the backward-movement determining flag on the basis of the result determined by the step of determining forward or backward-movement (S20).

That is, in the flowcharts shown in FIGS. 1A to 1C, if it is determined that the yaw value difference is larger than the critical difference value, a straight-movement determining flag is set to 1 when the forward-movement-related flag has been set to 1 at the step of determining forward or backward-movement (S20), whereas the straight-movement determining flag is set to 0 and the backward-movement determining flag is set to 1 when the backward-movement-related flag has been set to 1.

Therefore, as ABS, TCS, or ESC of a vehicle, a controller of apparatuses for controlling the wheels according to movements of a vehicle discriminates whether the vehicle is moving forward or backward on the basis of the set values of the forward-movement determining flag and the backward-movement determining flag, and performs appropriate control.

In particular, in a vehicle equipped with a manual transmission, a specific sensor for determining forward or backward-movement of the vehicle is not required and the forward or backward-movement of the vehicle is detected by only the yaw sensor, steering wheel angle sensor, and vehicle velocity sensor, such that apparatuses for controlling the wheels according to movements of the vehicle, such as ABS, TCS, or ESC, are controlled correspondingly.

The appropriate control herein implies to perform the original functions of the apparatuses, such as ABS, TCS, or ESC, when the vehicle is moving forward, while not to perform the original functions or to perform control to fit the backward-movement, when the vehicle is moving backward.

Therefore, in a vehicle that is equipped with a manual transmission does not have a TCU that provides information on forward or backward movement of the vehicle, it is also possible to allow the apparatuses for controlling the wheels according to movements of the vehicle, such as ABS, TCS, or ESC, to correctly and stably operate according to the forward or backward-movement.

Further, the control method of the present invention may be used for vehicles equipped with an automatic transmission or other vehicles to correspond to requirements for surely checking forward or backward-movement.

What is claimed is:

1. A method of controlling a vehicle, the method comprising:
    determining whether the vehicle is moving or not;
    providing a first yaw value obtained using an output of a yaw sensor of the vehicle;
    providing a second yaw value obtained using an output of a steering angle sensor of the vehicle and an output value of a lateral acceleration sensor of the vehicle, wherein the second yaw value is an average value of a third yaw value and a fourth yaw value, wherein the third yaw value is obtained using the output value of the steering angle sensor of the vehicle, wherein the fourth yaw value is obtained using the output value of a lateral acceleration sensor of the vehicle;
    determining whether the vehicle is moving in a forward or backward direction, wherein the vehicle is determined moving in the forward direction when both the first and second yaw values are greater than or when both the first and second yaw values are smaller than zero, wherein the vehicle is determined moving in the backward direction when one of the first and second yaw values is greater than zero and the other is smaller than zero; and
    controlling at least one apparatus of the vehicle using the determination the vehicle's movement in the forward or backward direction.

2. The method of claim 1, wherein the third yaw value $\dot{\psi}_3$ is obtained using from the following formula, $$\dot{\psi}_3 = \frac{\delta_{swa}}{i_L l} \times \frac{V_{ref}}{\left(1 + \left(\frac{V_{ref}}{V_{ch}}\right)^2\right)}$$

wherein $\delta_{swa}$ is a steering wheel angle;
wherein $i_L$ is a steering ratio;
wherein l is a wheel base;
wherein $V_{ref}$ a vehicle reference velocity;
wherein $V_{ch}$ is a characteristic vehicle velocity.

3. The method of claim 1, wherein the fourth yaw value $\dot{\psi}_4$ is obtained from the following formula, $$\dot{\psi}_4 = \frac{a_{lat}}{V_{ref}}$$

wherein $a_{lat}$ is a lateral acceleration.

4. The method of claim 1, wherein it is determined that the vehicle is not moving when velocities of all wheels of the vehicle are smaller than a predetermined value and further when the absolute value of the first yaw value is smaller than a predetermined turning value.

5. A method of controlling a vehicle, the method comprising:
    determining whether the vehicle is moving or not;
    providing a first yaw value obtained using an output of a yaw sensor of the vehicle;
    providing a second yaw value obtained using an output of a steering angle sensor of the vehicle;
    determining whether the vehicle is moving in a forward or backward direction, wherein the vehicle is determined moving in the forward direction when both the first and second yaw values are greater than or when both the first and second yaw values are smaller than zero, wherein the vehicle is determined moving in the backward direction when one of the first and second yaw values is greater than zero and the other is smaller than zero;
    controlling at least one apparatus of the vehicle using the determination the vehicle's movement in the forward or backward direction; and
    confirming the determination of the vehicle's movement in the forward or backward direction, wherein the determination is confirmed when the absolute value of a difference between the first yaw value and the second yaw value exceeds a predetermined value.

6. A method of controlling a vehicle, the method comprising:
    determining whether the vehicle is moving or not;
    providing a first yaw value obtained using an output of a yaw sensor of the vehicle;
    providing a second yaw value obtained using an output of a steering angle sensor of the vehicle;
    determining whether the vehicle is moving in a forward or backward direction, wherein the vehicle is determined moving in the forward direction when both the first and second yaw values are greater than or when both the first and second yaw values are smaller than zero, wherein the vehicle is determined moving in the backward direction when one of the first and second yaw values is greater than zero and the other is smaller than zero; and
    controlling at least one apparatus of the vehicle using the determination the vehicle's movement in the forward or backward direction, wherein the first yaw value is a value modified by an off-set value from the output of the yaw sensor.

* * * * *